Patented Feb. 27, 1945

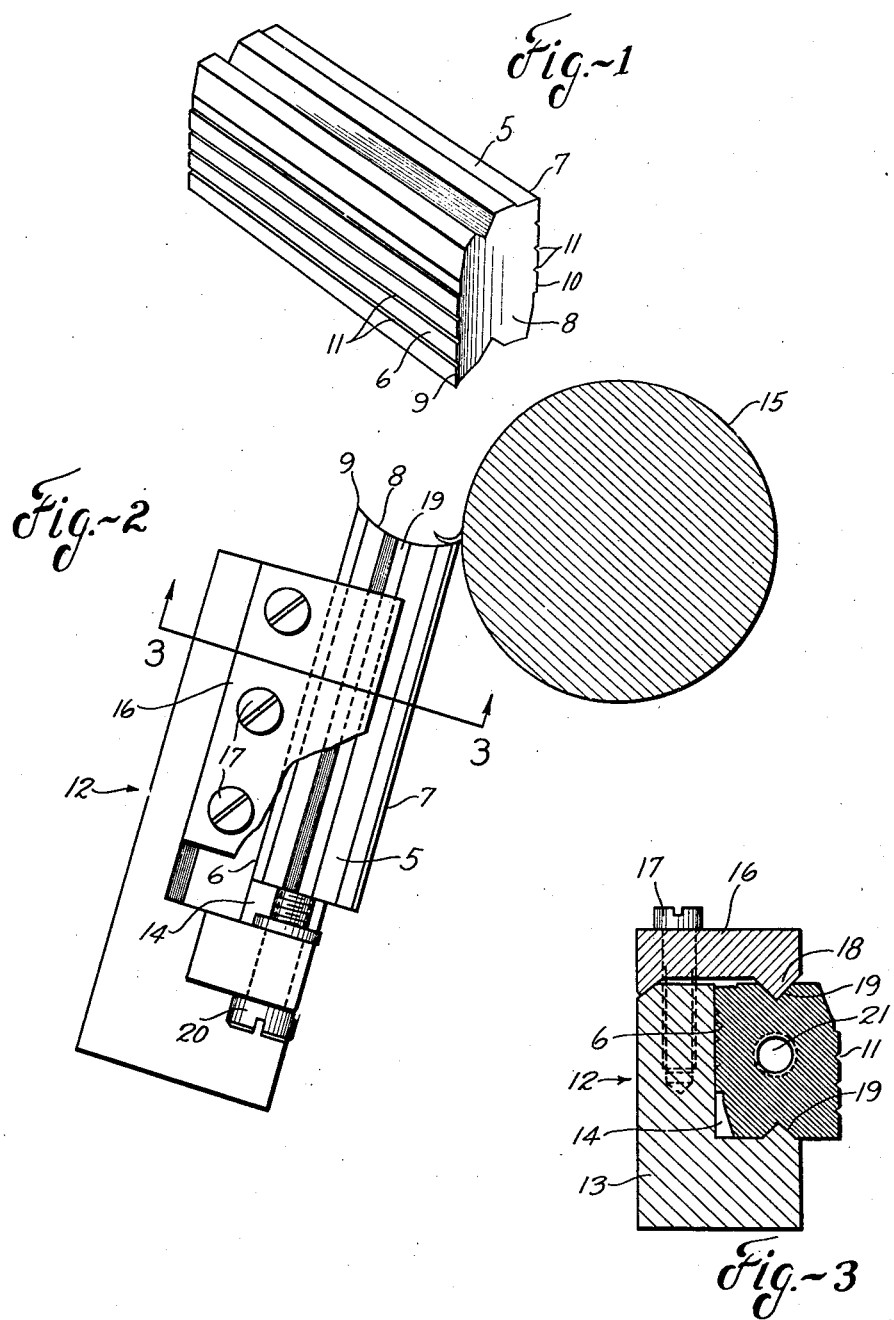

2,370,273

UNITED STATES PATENT OFFICE 2,370,273

CUTTER

Edward A. Ulliman, Springfield, Ohio

Application May 20, 1943, Serial No. 487,720

1 Claim. (Cl. 29—95)

This invention relates to a cutter and more particularly to a forming cutter for use in machines of the type in which a work piece rotates against the cutting edge of a stationary cutting tool.

One object of the invention is to provide a cutter of such a construction that the intervals between successive grindings will be materially increased in length, thereby increasing the useful life of the cutter.

A further object of the invention is to provide a cutter having a plurality of cutting edges so arranged that they may be ground simultaneously and the grinding of the several edges will consume no more material than is consumed in the grinding of the single cutting edge of an ordinary cutter.

A further object of the invention is to provide a two edged cutter of such a character that when one cutting edge becomes dull the other cutting edge may be moved to cutting position without the necessity of adjusting the cutter longitudinally with relation to the work piece.

A further object of the invention is to provide a cutter of such a character that the friction between the chip and the face of the cutter will be materially reduced.

A further object of the invention is to provide such a cutter which permits a freer circulation of the coolant than is had with the ordinary type of cutter.

Other objects of the invention may appear as the cutter is described in detail.

In the accompanying drawing Fig. 1 is a perspective view of a cutter embodying my invention; Fig. 2 is an edge elevation of the cutter showing the same mounted in a supporting device and in operative relation to the work piece; and Fig. 3 is a transverse section taken on the line 3—3 of Fig. 2.

In the drawing I have illustrated the invention as embodied in a cutter designed to perform a specific forming operation and mounted in a conventional supporting structure, but it is to be understood that the invention may take various forms and may be embodied in cutters of various kinds and that the cutter may be mounted in any suitable manner. The ordinary forming cutter comprises an elongate block of steel having a cutting edge at one side only of its operative end or working face, and said face is in a plane extending obliquely from the cutting edge to the opposite side of the block or body of the cutter. The cutter is mounted in a fixed supporting structure adjacent to the rotatable work piece and is longitudinally adjustable thereon to accurately position the cutting edge thereof with relation to the work piece. The cutter must be ground from time to time to maintain the cutting edge sharp and after each such grinding it must be adjusted to locate the cutting edge in proper relation to the work piece, and of course each grinding shortens the cutter and reduces the useful life thereof.

My improved cutter is provided with two cutting edges, at opposite sides of one end thereof, so that when one cutting edge becomes dull the other cutting edge may be moved to operative position by releasing the cutter and turning the same about a longitudinal axis through an arc of one hundred and eighty degrees, and inasmuch as the grinding of the two edges does not reduce the length of the cutter any more than the grinding of a single edge will reduce the same the useful life of the cutter is at least doubled. Preferably the two cutting edges are provided by forming in the body of the cutter at one end thereof a recess extending for the full width of the body between opposite longitudinal surfaces of the latter, those portions of the wall of the recess which are adjacent the respective longitudinal surfaces being inclined and the outer portion of said recess being of a width approximating the thickness of said body to form cutting edges at the adjacent ends of said longitudinal surfaces. The inclined surfaces extend from lines on the opposite sides of a longitudinal central plane to the respective cutting edges and are shaped to cause the chips severed by the respective cutting edges to curl outwardly from the wall of the recess. By curving these lateral portions of the wall of the recess about a common axis the chips are not only caused to curl but the two cutting edges of the cutter may be ground simultaneously.

In the particular construction here illustrated the cutter comprises an elongate body 5 of steel approximately rectangular in cross section, two opposite longitudinal surfaces 6 and 7 of the body being in parallel planes. At one end of the cutter the body is provided with a transverse recess 8 between the end portions of said parallel surfaces and extending for the full width of the cutter, the recess being so shaped that the lateral portions of the wall thereof, that is, the end surfaces of the body, are in lines sloping outwardly and intersecting the planes of the respective parallel surfaces at the ends of the latter, thus forming cutting edges 9 and 10 at the ends of the respective surfaces. Preferably the wall of the recess conforms to the arc of a circle described about an axis between the planes of said parallel surfaces and spaced equal distances from the ends of said parallel surfaces, so that the two cutting edges are in a transverse plane at substantially right angles to the length of the body, the radius of the arc being such as to impart the desired inclination of the lateral portions of the wall of the recess. While the longitudinal surfaces should be spaced equal distances one from the other throughout their length it is not necessary that they should be flat or smooth and in practice the transverse contour of these surfaces is such as to impart to the cutting edges a shape which will in turn impart the desired shape to the work piece. As here shown, each of said longitudinal surfaces is provided with a plurality of longitudinal laterally spaced grooves 11 which divide the cutting edge thereof into a series of spaced sections so as to form shallow laterally spaced ribs on the rotating work piece.

The cutter may be mounted in any suitable manner and is here shown as mounted on a common type of supporting structure 12 which comprises a fixed member 13 having an elongate recess 14 adapted to receive the cutter, this recess being inclined to support the cutter in proper position with relation to the work piece 15. One side of the recess is overlapped by a clamping plate 16 which is secured to the fixed member 13 by screws 17. The clamping plate and the opposed wall of the recess are provided with longitudinal V-shaped ribs 18 which extend into correspondingly shaped grooves 19 in the lateral edges of the body 5 of the cutter, so that when the screws 17 are tightened down the cutter will be rigidly secured to the supporting structure or mounting 12. The grooves 19 are parallel with and are spaced equal distances from the longitudinal surfaces 6 and 7 so that when the cutter is mounted with either surface outermost the operative cutting edge will be in proper position with relation to the work piece. This mounting permits of the longitudinal adjustment of the cutter as the latter is shortened by the grinding of the cutting edges and this adjustment is effected by a screw 20 which extends into a screw threaded bore 21 in the body of the cutter and is supported by a part of the fixed member 13. Thus by loosening the clamping plate and rotating the screw the cutter may be very accurately adjusted with relation to the work piece.

It is obvious that a cutter having two alternately usable cutting edges at the same end thereof will have a useful life at least twice as long as the life of a similar cutter having a single cutting edge, as the grinding of the two cutting edges will reduce the length of the cutter no more than the grinding of a single cutting edge. The provision of two cutting edges also enables the cutter to remain in operation at least twice as long between grinding operations because when one edge becomes dull it is only necessary to remove the clamping plate and reverse the position of the cutter to place the other, and sharp, edge in operative position and it is not necessary to take the cutter out of service for grinding until both edges are dull. The two cutting edges being in the same transverse plane the mere reversal of the cutter will place the sharp edge in correct operative relation to the work piece without readjustment, such readjustment being necessary only after grinding both edges. The arcuate shape of the recess between the cutting edges enables both edges to be ground at the same time and this not only reduces the time for grinding but insures the maintenance of the two cutting edges in the same transverse plane. The arcuate shape of the wall of the recess adjacent each cutting edge also serves to cause the chip which is severed to curl outwardly, thereby permitting a freer circulation of the cooling liquid in contact with the cutting edge and work piece and reducing the friction between the chip and the cutter. The reduction of the friction of course reduces the heat generated in the cutting operation and due to this reduction in friction and heat each cutting edge will operate without becoming dull for a much longer time than will the cutting edge of the usual forming cutter. Consequently the intervals between grindings of my two edged cutter are increased in length far beyond twice the length of the intervals between grindings of the single cutting edge of the ordinary cutter, and the life of the two edged cutter is much more than double the life of a similar cutter having a single cutting edge. The reduction in friction also reduces the power required to rotate the work piece in contact with the cutter, thus effecting a further saving in production costs.

While the invention is shown as embodied in a stationary cutter operating on a rotating work piece it is not limited to such a cutter but may be embodied in some types of movable cutters.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

A forming cutter comprising an elongate body having opposed longitudinal surfaces substantially parallel one with the other and having in one end thereof a transverse recess of uniform depth extending for the full width of said body, the wall of said recess conforming to a section of a cylinder, having its axis parallel with and spaced equal distances from said longitudinal surfaces and having a diameter greater than the distance between said longitudinal surfaces, thereby forming parallel transverse cutting edges at the adjacent ends of said longitudinal surfaces, the longitudinal configuration of said surfaces being such as to impart to said cutting edges identical shapes adapted to form a predetermined configuration on the work piece.

EDWARD A. ULLIMAN.